May 5, 1970  R. J. RESCH  3,510,751
NATURALLY SAMPLED QUAD PULSE WIDTH MODULATED INVERTER
Filed Feb. 26, 1968  5 Sheets-Sheet 1

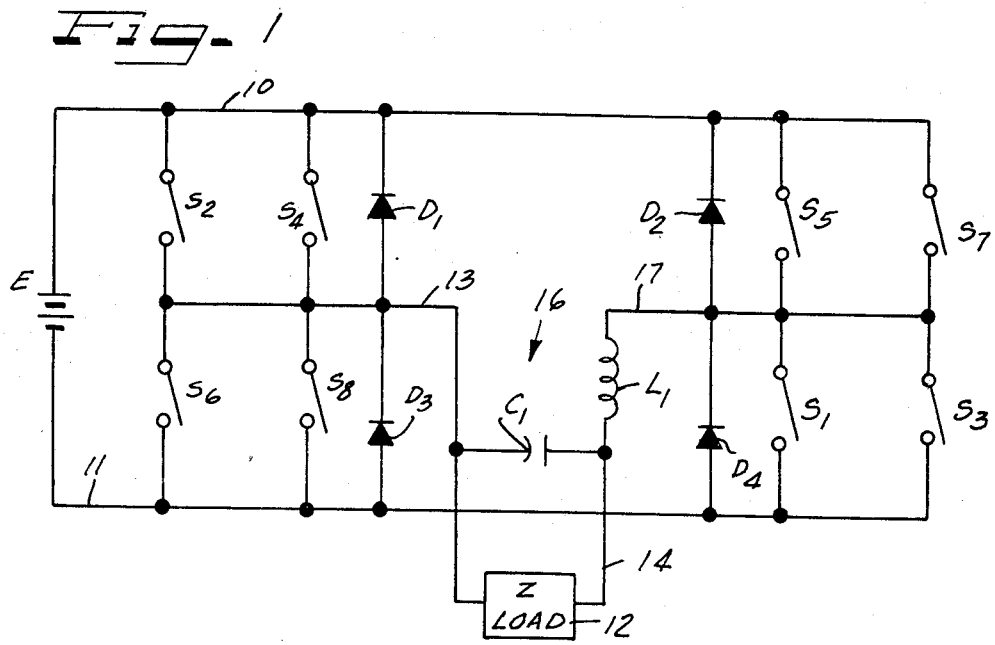

Fig. 1

TABLE 1
LOGIC LOCKOUT SEQUENCE TO
PREVENT SHORT CIRCUITS ACROSS SOURCE E

+ OUTPUT $S_1$ $S_2$ $S_7$ $S_4$ — BLANK $S_7$
$S_1$ $S_6$ $S_3$ $S_4$ — BLANK $S_6$
$S_1$ $S_2$ $S_3$ $S_8$ — BLANK $S_8$
$S_5$ $S_2$ $S_3$ $S_4$ — BLANK $S_5$

− OUTPUT $S_5$ $S_6$ $S_3$ $S_8$ — BLANK $S_3$
$S_5$ $S_2$ $S_7$ $S_8$ — BLANK $S_2$
$S_5$ $S_6$ $S_7$ $S_4$ — BLANK $S_4$
$S_1$ $S_6$ $S_7$ $S_8$ — BLANK $S_1$

0 OUTPUT $S_5$ $S_2$ $S_7$ $S_4$ — NO BLANK
$S_1$ $S_6$ $S_3$ $S_8$ — NO BLANK

0 OUTPUT $S_1$ $S_6$ $S_7$ $S_4$ — BLANK $S_7$ $S_4$
$S_5$ $S_2$ $S_3$ $S_8$ — BLANK $S_3$ $S_8$

INVENTOR.
ROBERT J. RESCH
BY *[signature]* ATTORNEYS

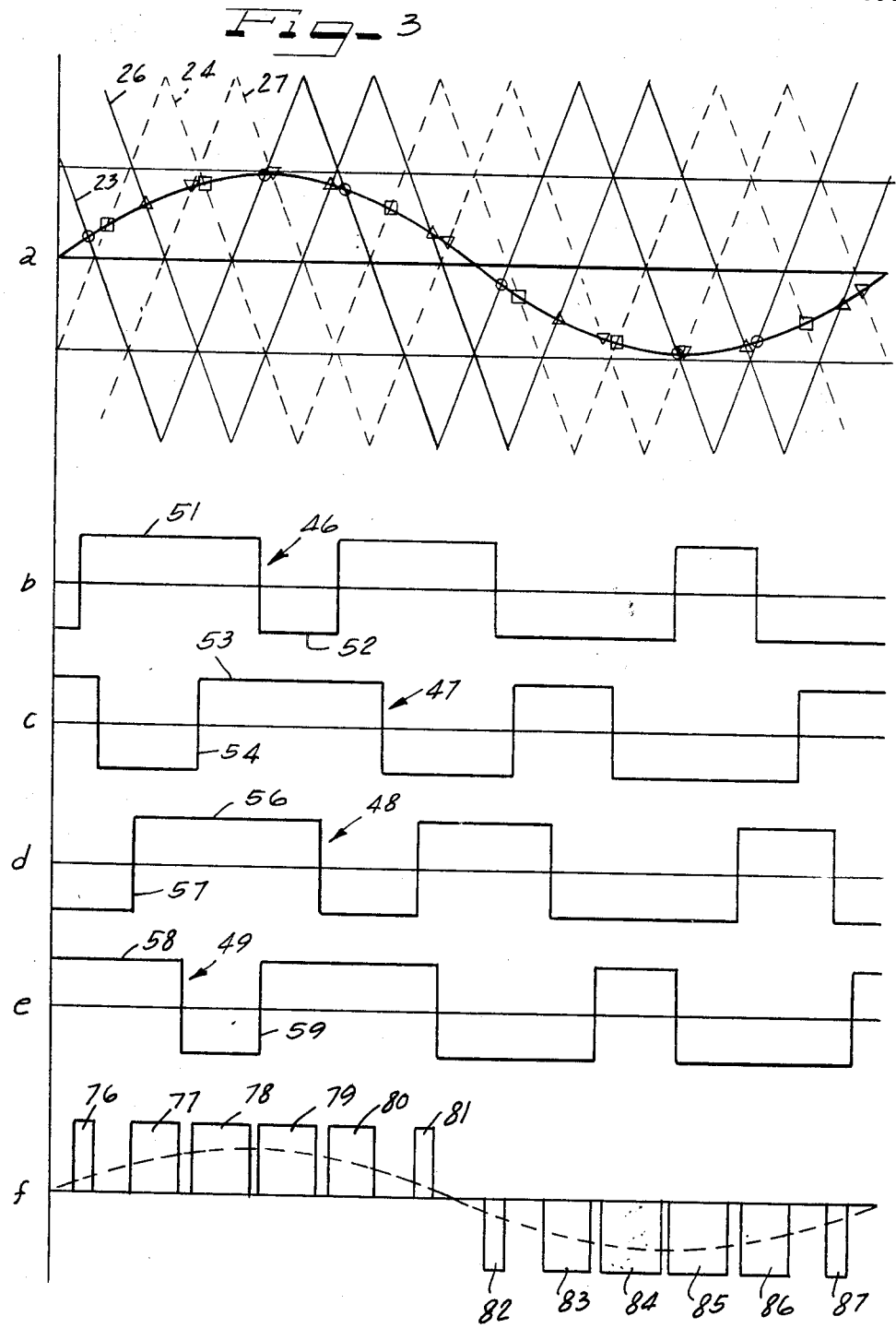

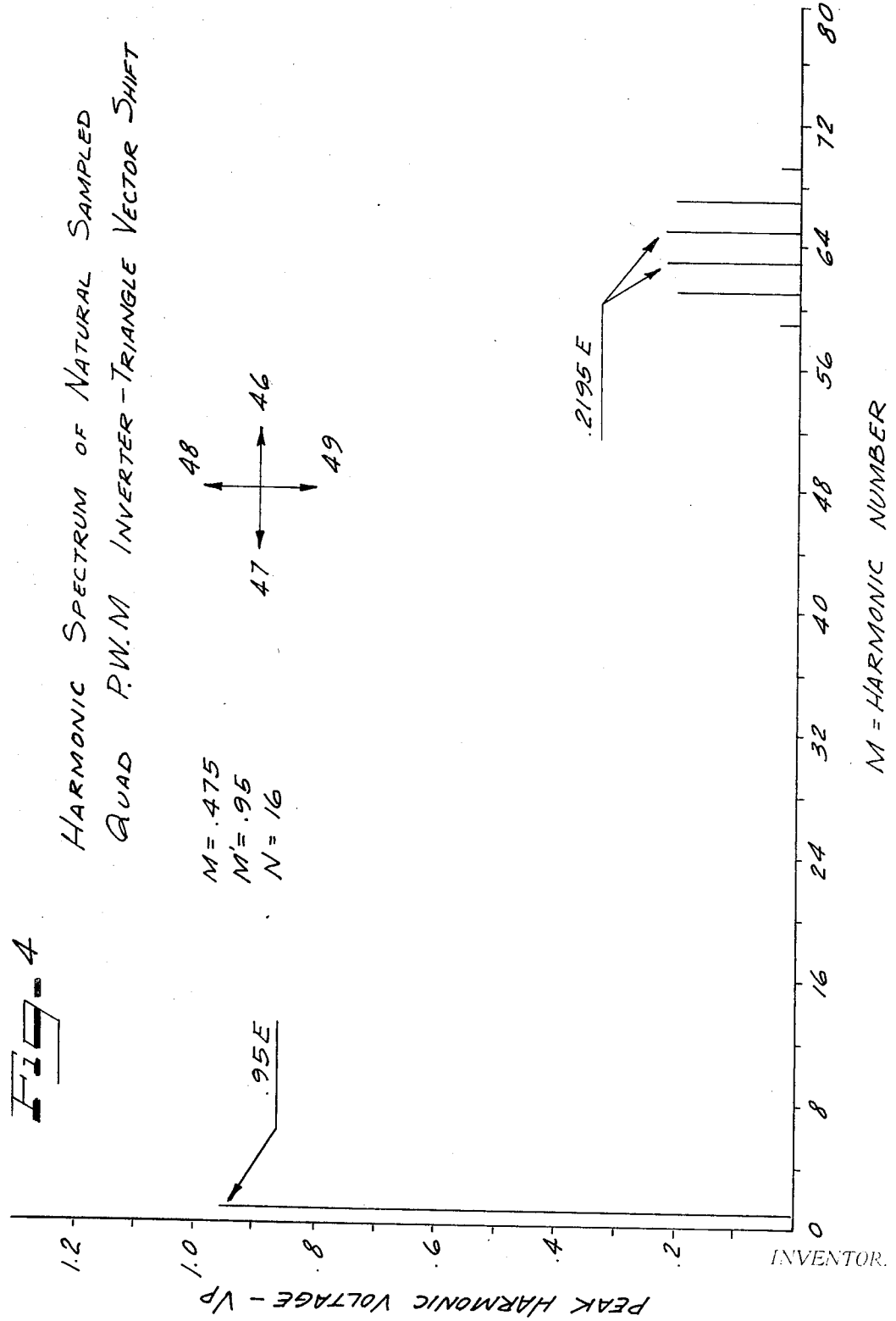

United States Patent Office 3,510,751
Patented May 5, 1970

3,510,751
NATURALLY SAMPLED QUAD PULSE WIDTH MODULATED INVERTER
Robert J. Resch, Euclid, Ohio, assignor to TRW Inc., Cleveland, Ohio, a corporation of Ohio
Filed Feb. 26, 1968, Ser. No. 708,236
Int. Cl. H02m *1/12, 7/44*
U.S. Cl. 321—9
9 Claims

ABSTRACT OF THE DISCLOSURE

A static inverter capable of inverting a direct current source to an alternating current output voltage which utilizes a switching arrangement between the direct current source and the load comprising a plurality of triangular shaped timing pulses and a reference sine wave.

CROSS REFERENCE TO RELATED APPLICATION

This application is related to the copending application entitled "Power Frequency Multiplication Using Natural Sampled Quad Pulse Width Modulated Inverter," Ser. No. 707,754.

BACKGROUND OF THE INVENTION

Field of the invention

This invention relates to a static inverter capable of inverting a direct current source to an alternating current output voltage which utilizes triangular shaped waves and a reference sine wave in combination with a logic circuit to control a plurality of power switches, which in turn switch the direct current source to the load.

BRIEF SUMMARY OF THE INVENTION

A naturally sampled quad pulse width modulated inverter which utilizes a plurality of triangular shaped waves in combination with a reference sine wave to produce timing signals for controlling power switches that gate a direct current voltage to a load. The invention eliminates the requirement for power transformers on the output and produces a high operating efficiency and is capable of achieving a realtive modulation index of 1. The static inverter, according to this invention, is light weight and uses standard semiconductors such as transistors, gate control switches and silicon controlled rectifiers as the power switches.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a schematic view illustrating the static inverter according to this invention;

FIGS. 3a through 3f illustrate waveforms in the various portions of the invention; and FIG. 4 illustrates the output voltage spectrum.

Figure 2A:
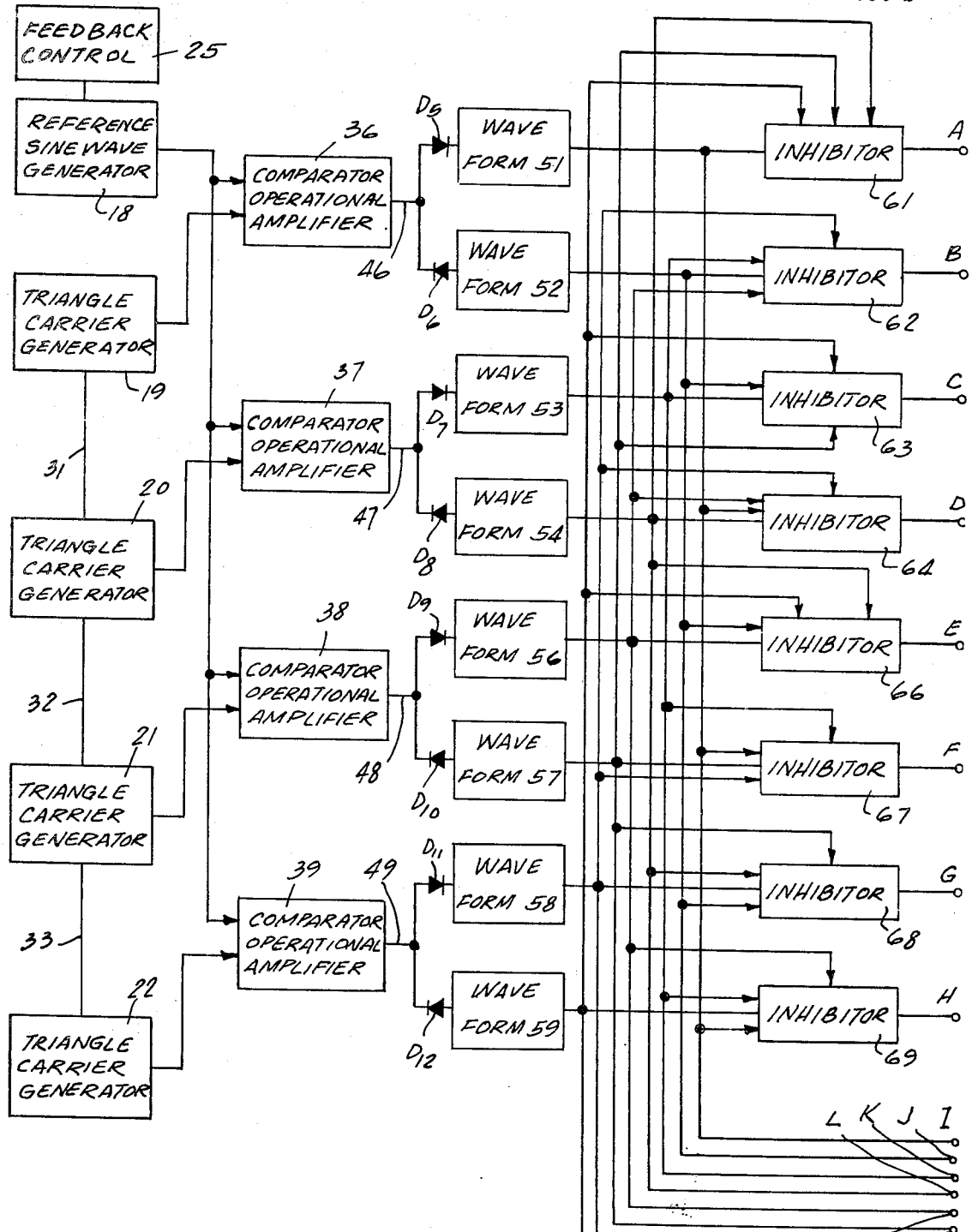
FIGS. 2a and 2b are block diagrams of the basic switch logic required for this invention.

Table 1 shows the logic lockout sequence to prevent short circuits across the direct current voltage source.

DETAILED DESCRIPTION OF THE INVENTION

FIG. 1 illustrates a voltage source E which has a plus and negative terminal connected respectively to leads 10 and 11. A load 12 is connected to terminals 13 and 14 and a filter 16 comprising a capacitor $C_1$ and the inductance $L_1$ are connected across the load 12 between leads 13 and 14. A lead 17 is connected to one side of the inductance $L_1$. A plurality of power switches $S_1$–$S_8$ are connected between the leads 10, 11, 13 and 17, as shown in the figure. For example, power switches $S_4$ and $S_2$ are connected between leads 10 and 13. A diode $D_1$ is also connected between these leads with its cathode connected to the positive terminal of the voltage source E. Power switches $S_1$ and $S_3$ are connected between leads 11 and 17 and a diode $D_4$, connected to the negative terminal of the voltage source E is also connected between leads 11 and 17. Power switches $S_5$ and $S_7$ are connected between leads 10 and 17 and a diode $D_2$ with its cathode connected to the positive terminal of the voltage source E is also connected between these leads. Power switches 6 and 8 are connected between leads 11 and 13 and a diode $D_3$ is connected between these leads with its anode connected to the negative terminal of the voltage source E.

Figure 2B:
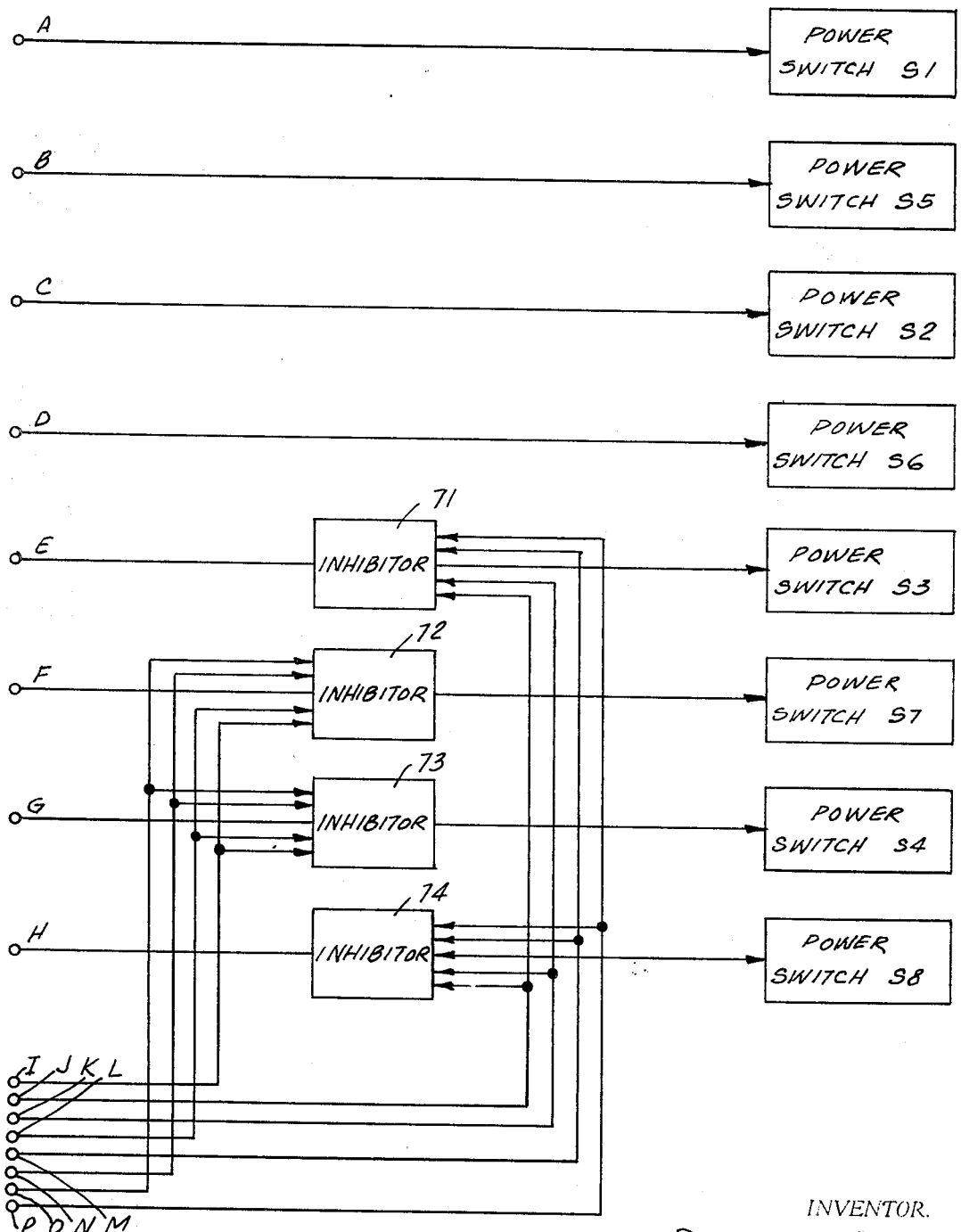

The direct current voltage from the source E is converted by the power switches in the circuit shown in FIG. 1 to an A.C. output voltage which is supplied to load 12 by the circuit of FIG. 1 and the structure of FIG. 2. The waveforms shown in FIG. 3 illustrate the operation of the static inverter.

FIG. 2 illustrates a reference sine wave generator 18 and four triangle carrier generators 19, 20, 21 and 22 which are phase locked. For example, the lead 31 extends between the triangle carrier generator 19 and the triangle carrier generator 20. As shown in FIG. 3a, the output triangle of the triangle carrier generator 19 is illustrated as waveform 23. Lead 31 couples generator 19 with the triangle carrier generator 20 and so that it produces a waveform 180° out of phase with the output of the generator 19. This is illustrated by waveform 24 in FIG. 3a. Lead 32 provides a synchronizing link between triangle carrier generator 20 and the triangle carrier generator 21. Carrier generator 21 produces an output wave illustrated by numeral 26 in FIG. 3a. This waveform leads the wave from triangle carrier generator 19 by 90°. Lead 33 connects triangle carrier generator 21 with triangle carrier generator 22. The triangle carrier generator 22 produces an output waveform 27, as shown in FIG. 3a, which is 180° out of phase with the output of the triangle carrier generator 21.

Four comparator operational amplifiers 36, 37, 38 and 39 receive inputs from the reference sine wave generator 18. The first comparator operational amplifier 36 also receives an input from the triangle carrier generator 19. The second comparator operational amplifier 37 also receives an input from the triangle carrier generator 20. The comparator operational amplifier 38 receives an input also from the triangle carrier generator 21, and the comparator operational amplifier 39 receives an input from the triangle carrier generator 22.

Reference sine wave generator 18 also receives an input from feedback control 25 so as to vary the modulation index M of the sampling system which in turn regulates the output voltage for both the load and source variations. The output of comparator operational amplifier 36 occurs on its output lead and is indicated generally by numeral 46 in FIGS. 2 and 3b. It should be noted that wave shape 46 goes above and below the zero reference voltage as shown in FIG. 3b. A pair of diodes $D_5$ and $D_6$ receive the output of amplifier 36 and are oppositely poled so as to allow the positive and negative portion of the waves 46 to pass. For example, the diode $D_5$ passes the positive portion of the waves which is indicated by numeral 51 in FIG. 3b. The diode $D_6$ allows the negative portion of the wave 46 to pass which is indicated by numeral 52 in FIGS. 2 and 3b.

Comparator operational amplifier 37 produces an output waveform 47 as indicated in FIG. 3c which goes above and below the zero voltage level. A pair of diodes $D_7$ and $D_8$ are oppositely poled and receive the output from amplifier 37 to pass, respectively, the positive and negative portions of the wave 47. The positive portion of the wave 47 is indicated by numeral 53 and the negative portion is indicated by the numeral 54.

Operational amplifier 38 produces wave shape 48 which is shown as FIG. 3b. A pair of diodes $D_9$ and $D_{10}$ receive the output of amplifier 38 and pass, respectively, the negatives and positive portions of the wave 48. For example, the positive portion of the wave 48 is indicated by numeral 56 in FIG. 3d and the negative portion is indicated by numeral 57 in FIG. 3d.

Operational amplifier 39 produces output wave 49 which goes above and below the zero voltage reference as shown in FIG. 3e. A pair of oppositely poled diodes $D_{11}$ and $D_{12}$ receive the output of this amplifier and pass, respectively, the positive and negative portions of the wave. The positive of the wave is indicated by numeral 58 and the negative portion by numeral 59 in FIG. 3e.

Two groups of inhibitors, 61–69 and 71–74 are connected between the comparators 36–39 and the power switches $S_1$–$S_8$ to selectively switch them on to provide the switching function in the inverter. Waveform 51 is supplied to the input of inhibitor 61 and the output of inhibitor 61 is supplied to power swicth $S_1$. Wave shape 52 is supplied to inhibitor 62 and the output is supplied to power switch $S_5$. The wave shape 53 is supplied to inhibitor 63 and its output is supplied to the power switch $S_2$. The wave shape 54 is supplied to inhibitor 64 and its output to power switch $S_6$. The wave shape 56 is supplied to inhibitor 66 and its output is connected to the input of inhibitor 71 and the output of inhibitor 71 is connected to the power switch $S_3$. Wave shape 57 is supplied to the input of inhibitor 67 which has its output connected to the input of inhibitor 72 which has its output connected to the power switch $S_7$. The wave shape 58 is connected to the input of inhibitor 68 which has its output connected to the input of inhibitor 73 which has its output connected to the power switch $S_4$. Wave shape 59 has its input connected to inhibitor 69 which has its output connected to the input of inhibitor 74. The output of inhibitor 74 is connected to power switch $S_8$.

The inhibitors 61–69 additionally receive inputs of three of the wave shapes 51–59. The inhibitors 61–69 remove signals on the power switches $S_1$–$S_8$ when inputs to the three inhibit inputs are received by the inhibitors. For example, the inhibitor 61 receives the three wave shapes 54, 57, 59. When all of these three signals are present and supplied to the inhibitor 61, the inhibitor blocks the signal 51 from being supplied to the power switch $S_1$. Likewise, the inhibitor 62 receives the input waves 53, 56 and 58, and when these signals are present, the inhibitor 62 blocks the signal 52 from the power switch $S_5$.

The inhibitor 63 receives the signals 52, 57 and 59. When these signals are present, the inhibitor 63 blocks the signal 53 from the power switch $S_2$. The inhibitor 64 receives signals 58, 56 and 51. The inhibitor 66 receives signals 59, 54 and 52. The inhibitor 67 receives signals 51, 53 and 58. The inhibitor 68 receives signals 57, 54 and 52. The inhibitor 69 receives signals 51, 53 and 56. The inhibitors 66–69 supply their outputs to the inhibitors 71–74. The inhibitors 71–74 receive four input gating signals and prevent the signals 56–59 respectively, from being supplied to the power switches $S_3$, $S_7$, $S_4$ and $S_8$ when four input signals are present on their inputs. For example, inhibitor 71 receives signals 52, 53, 56 and 59. Inhibitor 72 receives signals 58, 57, 54 and 51. Inhibitor 73 receives signals 51, 54, 57 and 58. Inhibitor 74 receives the same input signals as inhibitor 71.

FIG. 3f illustrates the output waveform to the filter 16 comprising the capacitance $C_1$ and the inductance $L_1$.

It is to be noted that a plurality of positive pulses 76–81 and a plurality of negative pulses 82–87 are formed. The filter 16 comprising the capacitance $C_1$ and inductance $L_1$ smooths this signal and supplies and alternating waveform to the load 12.

Table 1 illustrates the logic lockout sequence to present short circuits occurring across the voltage source E.

The logic in Table 1 will be explained with reference to the drawings and it is to be noted that the waveforms 46, 47, 48 and 49 are utilized to control the switches $S_1$–$S_8$ so that signal applied to the filter 16 is of the shape shown in FIG. 3f comprising the positive pulses 76–81 and the negative pulses 82–87. It is to be noted that the width of the positive and negative pulses vary from relatively narrow, for example pulses 76 and 81, to relatively wider pulses such as 77, 78, 79 and 80. In operation, starting with zero time, waveform 52, 53, 57 and 59 are formed in the comparators 36–39. These four signals are compared in the inhibit logic of FIG. 2 and results in all four of the power switches $S_5$, $S_2$, $S_7$ and $S_4$ being turned on. As shown in FIG. 1, these switches do not apply any power to the load since they are all on the positive side of the source. They, however, provide a reactive current path for the loaded filter.

The signal source 52 now switches to 51 (see FIG. 3b) and signals 53, 57 and 58 remain the same. These four signals are compared in the inhibit logic of FIG. 2 resulting in no signal being applied to the power switch $S_7$. This prevents a short circuit across the source through the path created by power switches $S_7$ and $S_1$.

Signal source 53 next switches to 54 resulting in the signal switches $S_1$, $S_6$, $S_7$ and $S_4$ being energized. These four signals are compared in the inhibit logic of FIG. 2 resulting in no signals being applied to the power switches $S_7$ and $S_4$. No power is applied to the load. However, power switches $S_1$ and $S_6$ provide a reactive current path for the load current.

The switching sequences are continued as above, creating the voltage waveform in FIG. 3f across the filter and the load. The complete switching sequence from FIG. 3 waveforms 46, 47, 48 and 49 are given for one full cycle of the output voltage so as to clarify the circuit operation.

TABLE 1

| Signal source | Power Switches | Output |
| --- | --- | --- |
| 52-53-57-58 | S5-S2-S7-S4 | 0 |
| 51-53-57-58 | S1-S2-S4 (Blank S7) | +1 |
| 51-54-57-58 | S1-S6 (Blank S7 S4) | 0 |
| 51-54-57-58 | S1-S3-S4 (Blank S6) | +1 |
| 51-54-56-58 | S1-S6-S3-S8 | 0 |
| 51-53-56-59 | S1-S2-S3 (Blank S8) | +1 |
| 52-53-56-59 | S5-S2 (Blank S3, S8) | 0 |
| 52-53-56-58 | S2-S3-S4 (Blank S5) | +1 |
| 52-53-57-58 | S5-S2-S7-S4 | 0 |
| 51-53-57-58 | S1-S2-S4 (Blank S7) | +1 |
| 51-54-57-58 | S1-S6 (Blank S7, S4) | 0 |
| 51-54-56-58 | S1-S3-S4 (Blank S6) | +1 |
| 51-54-56-59 | S1-S6-S3-S8 | 0 |
| 52-54-56-58 | S5-S6-S8 (Blank S3) | −1 |
| 52-53-56-59 | S5-S2 (Blank S3, S8) | 0 |
| 52-53-57-59 | S5-S7-S8 (Blank S2) | −1 |
| 52-53-57-58 | S5-S2-S7-S4 | 0 |
| 52-54-57-58 | S5-S6-S7 (Blank S4) | −1 |
| 51-54-57-58 | S1-S6 (Blank S7, S4) | 0 |
| 51-54-56-59 | S6-S7-S8 (Blank S1) | −1 |
| 51-54-56-59 | S1-S6-S3-S8 | 0 |
| 52-54-56-59 | S5-S6-S8 (Blank S3) | −1 |
| 52-53-56-59 | S5-S2 (Blank S3, S8) | 0 |
| 52-53-57-59 | S5-S7-S8 (Blank S2) | −1 |
| 52-53-57-58 | S5-S2-S7-S4 | 0 |

In the nautrally sampled quad pulse width modulated inverter shown, a carrier frequency to power frequency ratio of $N=3$ is used in this particular sample, although any value of the N can be used. In other words, three triangular wave shapes 23, 24, and 26 may be used. An absolute modulation index M of .475 is used and is defined as the ratio of the peak sine wave voltage divided by the peak triangular voltage.

$$M = \frac{V_p \text{ sine wave}}{V_p \text{ triangle}}$$

This results in a relative modulation index $M'=0.95$ for the quad pulse width modulation system shown in FIG. 3 waveform 3a. The relative modulation index $M'$ is defined as the absolute modulation index M multiplied by the vector space V used. In this case the V is equal to two for the two vector space and their complements. A relative modulation index $M'$ of 1 should not be exceeded in order to prevent over-modulation of the system which will result in power frequency harmonics, $M' \leq M_{max} \times V$ where $M_{max}$ defines the band limit. A relative phase shift is maintained between the triangle carrier frequency and the reference sine wave as shown in FIG. 3a. This relative phase shift is 45° with respect to the two sets of triangle vectors as shown in FIG. 3a.

A relative modulation index $M'$ is maintained between the triangle carrier frequency signals and the reference sine wave by means such as a feedback control 25 which controls the phase of the reference signal generator 18 as shown in FIG 2, the reference signal generator controlled by the feedback control from conventional feedback systems not shown. The four naturally sampled pulse width modulated waveforms shown in FIG. 3, waveforms 46, 47, 48 and 49, are applied to the power switches $S_1$–$S_8$ of the bridge circuit shown in FIG. 1 where they are compared. In order to prevent the switches from shorting out the source during the switching sequences, it is necessary to lock out various switch combinations in accordance with the logic block diagram of FIG. 2. This logic sequencing can be accomplished with low cost integrated circuitry, for example. The required logic sequence is shown in Table 1. The resultant pulse width modulated waveform that appears across the output filter $L_1$, $C_1$ and load 12 is shown in FIG. 3f. Harmonic analysis by digital computer reveals that there are no power frequency harmonics in this signal. The high frequency harmonics occur four times the carrier frequency and the fundamental has a relative amplitude of 0.95E, where E is the output of the D.C. power supply. It has been found that the amplitude of the fundamental is related to the source voltage by the relative modulation index $M'$ or $V_p$ fundamental is=to the quantity $(M' \times E)$ for any value of modulation index $M'$. (The resultant harmonic spectrum for $N=16$ is shown in FIG. 4 for $M'=.95$.) The output voltage regulation can be accomplished by controlling the modulation index $M'$. Current limit is obtained by reducing the modulation index $M'$ to a level slightly above zero since zero modulation index $M'$ will result in zero output. A small lightweight filter $L_1$, $C_1$ can be used because the harmonic spectrum occurs at four times the triangle carrier frequency. This will allow a fast response in the feedback loop resulting in minimum output voltage over-shoot and under-shoot when the load is step-changed from full load to no load and from no load to full load respectively.

The power switches $S_1$–$S_4$ and $S_5$–$S_8$ have finite turn "on" and "off" times. These finite switching times limit the maximum modulation index M that can be obtained from a given frequency ratio N for a standard bridge circuit using four power switches and two pulse width modulation sampling. This limitation is overcome in this quad-pulse width modulation inverter because of the long "off" times associated with each power switch for a high modulation index $M'$ as shown in waveforms 46, 47, 48 and 49. Therefore, more output power with a higher modulation index can be obtained with this invention. Also, a smaller A.C. filter may be required since the harmonics spectrum occurs at four times the triangle carrier frequency compared with two times the triangle carrier frequency for the standard two pulse width modulation bridge approach. The duty cycle for each power switch used in the quad-pulse width modulated approach is about half the duty cycle required for a two pulse width modulated bridge inverterd. Each power switch, however, must be capable of carrying the full load peak current. Therefore, if power transistors are used for the power switching elements, $S_1$–$S_8$, they are chosen so that they can carry peak load current. However, if silicon controlled rectifiers are used for the power switches, their size will be comparatively smaller for the quad-pulse width modulation approach than the two pulse width modulation approach because of the lower RMS current requirement. Faster switching times are also associated with smaller SCR's resulting in less commutation losses and a more efficient circuit.

Thus, the invention may be modified by increasing the number of triangular wave shapes to V vector space sampling where the harmonic spectrum occurs at 2V times the triangle carrier frequency. Therefore, if $V=3$ for a six pulse width modulated inverter using three triangle vectors and their complements, a vector spacing of 60° will result. A total of twelve power switches will be used in a bridge circuit for this number of triangle waves and the maximum absolute modulation index M will be 0.333. The harmonic spectrum will occur at six times the triangle carrier frequency. The duty cycle of each power switch will be about 70% compared with the quad-pulse width modulation inverter approach. The complexity of the logic will be increased in order to prevent short circuits across the source during the power switching sequence. Therefore, the complexity of the logic will normally dictate the practical limit of the V vector space sampling used.

The principles of the invention explained in connection with the sepcific examplifications thereon will suggest many other applications.

I claim as my invention:

1. A pulse width modulated inverter circuit comprising a D.C. power supply, a load, a first plurality of switches connected between one side of the load and one side of the power supply, a second plurality of switches connected between one side of the load and the other side of the power supply, and a fourth plurality of switches connected between the other side of the load and the other side of the power supply, and control means comprising a logic circuit for selectively closing said switches and connected to the first, second, third and fourth plurality of switches to control them so as to supply an alternating signal to the load.

2. A pulse width modulated inverter circuit comprising a D.C. power supply, a load, a first plurality of switches connected between one side of the load and one side of the power supply, a second plurality of switches connected between one side of the load and the other side of the power supply, a third plurality of switches connected between the other side of the load and the one side of the power supply, and a fourth plurality of switches connected between the other side of the load and the other side of the power supply, control means including a first signal source producing a generally sine wave-shaped output of a first frequency, a second signal source producing a time repetitive wave, combining means receiving outputs from the first and second signal sources to produce control signals to control the first, second, third and fourth plurality of switches, said control means includes third, fourth and fifth signal sources producing time repetitive signals and supplying inputs to the combining means to produce control signals for the first, second, third and fourth plurality of switches, the second, third, fourth and fifth signal sources produce generally triangularly-shaped outputs of a second frequency which is M times the first frequency and the outputs of the second, third, fourth and fifth signal sources phased 90° apart, the output of the first signal source does not change polarity at the same time as the outputs of the second, third, fourth and fifth signal sources, first, second, third and fourth operational amplifiers each receiving the output of the first signal source and each receiving second inputs from a respective one of the second, third, fourth and fifth signal sources to produce four gating waves.

3. A circuit according to claim 2, a plurality of inhibit circuits receiving inputs from the first, second, third and fourth operational amplifiers and selectively gating control signals to the first, second, third and fourth plurality of switches to control them.

4. A circuit according to claim 3, first, second, third and fourth polarity sensing means connected to the first, second, third and fourth operational amplifiers respectively, and producing eight polarity separated signals.

5. A circuit according to claim 4 wherein a first portion of the plurality of inhibit circuits receives four of the eight polarity separated signals and a second portion of the inhibit circuits receives four of the eight polarity separated signals and a fifth input from half of the first portion of inhibit circuits, and the outputs of the other half of the first portion of inhibit circuits and of the second portion of inhibit circuits are connected to control of the first, second, third and fourth plurality of switches.

6. A circuit according to claim 5 wherein the first, second, third and fourth plurality of switches control the D.C. power supply applied to the load so that the wave-shape across the load comprises a plurality of pulses synchronized with the output of the first signal source so that the output pulses change polarity when the output of the first signal source changes polarity.

7. A circuit according to claim 6 wherein the pulses across the load are pulse width modulated.

8. A circuit according to claim 7 wherein power frequency harmonics are not present in the wave-shape across the load.

9. A circuit according to claim 7 wherein the pulses become progressively wider after a polarity change occurs until the middle of the pulse group and then decrease in pulse width to the next polarity change.

References Cited

UNITED STATES PATENTS

| 3,105,944 | 10/1963 | Lostetter | 321—45 XR |
| 3,119,057 | 1/1964 | Wilson | 321—45 XR |
| 3,346,794 | 10/1967 | Stemmler | 321—9 XR |
| 3,409,817 | 11/1968 | Gillett. | |

LEE T. HIX, Primary Examiner

W. M. SHOOP, Jr., Assistant Examiner

U.S. Cl. X.R.

321—45